(12) United States Patent
Oda

(10) Patent No.: US 7,501,013 B2
(45) Date of Patent: Mar. 10, 2009

(54) FUEL ADSORPTION SHEET, MANUFACTURING METHOD THEREOF, AND AIR CLEANER

(75) Inventor: Kouichi Oda, Aichi-ken (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 295 days.

(21) Appl. No.: 11/552,288

(22) Filed: Oct. 24, 2006

(65) Prior Publication Data

US 2007/0113740 A1    May 24, 2007

(30) Foreign Application Priority Data

Nov. 21, 2005   (JP) .............................. 2005-336015

(51) Int. Cl.
*B01D 53/04* (2006.01)
(52) U.S. Cl. ...................... 96/154; 96/135; 55/385.3; 55/486
(58) Field of Classification Search ............... 96/108, 96/134, 135, 137, 138, 154; 55/385.3, 486, 55/487, 512, 514, 516
See application file for complete search history.

(56) References Cited

U.S. PATENT DOCUMENTS

| | | | | |
|---|---|---|---|---|
| 3,678,663 | A * | 7/1972 | Hansen | 96/141 |
| 4,217,386 | A * | 8/1980 | Arons et al. | 428/198 |
| 4,274,848 | A * | 6/1981 | La Gro | 96/6 |
| 4,418,662 | A * | 12/1983 | Engler et al. | 96/133 |
| 5,338,340 | A * | 8/1994 | Kasmark et al. | 96/135 |
| 5,423,903 | A * | 6/1995 | Schmitz et al. | 96/134 |
| 5,743,942 | A * | 4/1998 | Shelley et al. | 96/118 |
| 6,454,827 | B2 | 9/2002 | Takagaki et al. | |
| 6,592,655 | B2 | 7/2003 | Iriyama et al. | |
| 6,689,197 | B2 * | 2/2004 | Dick et al. | 96/118 |
| 6,692,555 | B2 | 2/2004 | Oda et al. | |
| 6,699,310 | B2 * | 3/2004 | Oda et al. | 96/132 |
| 6,712,887 | B2 * | 3/2004 | Ueki et al. | 96/134 |
| 7,132,007 | B1 * | 11/2006 | von Blucher et al. | 95/90 |
| 7,153,565 | B1 * | 12/2006 | Nabata et al. | 428/316.6 |
| 7,160,369 | B2 * | 1/2007 | von Blucher et al. | 96/132 |
| 7,344,586 | B2 * | 3/2008 | Zulauf et al. | 95/143 |
| 7,354,475 | B2 * | 4/2008 | Von Blucher | 96/134 |
| 7,360,530 | B2 * | 4/2008 | Oda et al. | 123/518 |
| 7,377,966 | B2 * | 5/2008 | Smith et al. | 96/154 |
| 7,416,584 | B2 * | 8/2008 | Hirata | 96/135 |
| 7,416,585 | B2 * | 8/2008 | Hirata | 96/135 |
| 2005/0279210 | A1 | 12/2005 | Hirata | |
| 2005/0284298 | A1 | 12/2005 | Hirata | |
| 2006/0272508 | A1 * | 12/2006 | Hoke et al. | 96/134 |

FOREIGN PATENT DOCUMENTS

JP        2003-042017        2/2003

* cited by examiner

*Primary Examiner*—Duane S Smith
*Assistant Examiner*—Robert A Clemente
(74) *Attorney, Agent, or Firm*—Caesar, Rivise, Bernstein, Cohen & Pokotilow, Ltd.

(57) ABSTRACT

A fuel adsorption sheet includes a sheet base. A fuel adsorbent and a reinforcing net are arranged in the sheet base. The reinforcing net is formed by a plurality of cords extending in at least three directions along a surface the sheet base. The fuel adsorption sheet is arranged in an air passage of an air cleaner. The sheet base includes a pair of covering sheets. The covering sheets have central portions for holding the fuel adsorption member and the reinforcing net and peripheral portions for holding only the reinforcing net. A fastening portion is defined in the peripheral portions of the sheet base when the covering sheets are bond together.

12 Claims, 6 Drawing Sheets

FUEL ADSORPTION SHEET, MANUFACTURING METHOD THEREOF, AND AIR CLEANER

BACKGROUND OF THE INVENTION

The present invention relates to a fuel adsorption sheet which is arranged downstream of a filter element in an air passage of an air cleaner to adsorb fuel vapor leaking out of an engine air intake system, a method for manufacturing such a fuel adsorption sheet, and an air cleaner employing such a fuel adsorption sheet.

Japanese Laid-Open Patent Publication No. 2003-42017 describes an air cleaner incorporating a fuel adsorption sheet of the prior art. The air cleaner includes a filter element for filtering intake air. The filter element is arranged in a cleaner housing so as to intersect with an air passage. The fuel adsorption sheet, which adsorbs fuel vapor leaking out of an air intake system in an engine, is arranged downstream of the filter element in the air passage so as to intersect with the air passage.

The fuel adsorption sheet has a peripheral portion entirely covered by a resin frame. The resin frame includes a plurality of fastening holes formed in correspondence with the cleaner housing. The resin frame is used to reinforce the entire periphery of the fuel adsorption sheet and to attach the fuel adsorption sheet to the cleaner housing.

However, the fuel adsorption sheet described in Japanese Laid-Open Patent Publication No. 2003-42017 is reinforced only at its peripheral portion. However, the fuel adsorption sheet also includes a central portion in which a fuel adsorption member of activated carbon or the like is arranged. The non-reinforced central portion of the fuel adsorption sheet may be broken by pressure produced when the engine backfires. Furthermore, the non-reinforced central portion of the adsorption sheet easily deforms. Such deformation may cause contact between the central portion and the upstream and adjacent filter element when vibrations are generated during normal operation of the vehicle. This may generate abnormal noise or break the filter element or the central portion of the fuel adsorption sheet. In order to avoid such problems, the filter element must be widely spaced from the fuel adsorption sheet. However, this would increase the size of the entire air cleaner.

SUMMARY OF THE INVENTION

It is an object of the present invention to provide a fuel adsorption sheet that sufficiently withstands backfire pressure and prevents breakage, while enabling an air cleaner of reduced size. It is also an object of the present invention to provide a method for manufacturing such a fuel adsorption sheet and an air cleaner employing such a fuel adsorption sheet.

One aspect of the present invention is a fuel adsorption sheet for arrangement in an air passage of an air cleaner. The fuel adsorption sheet includes a sheet base. A fuel adsorption member is arranged in the sheet base. A reinforcing net is arranged in the sheet base and includes a plurality of cords extending along a surface of the sheet base in at least three directions.

A further aspect of the present invention is a method for manufacturing a fuel adsorption sheet for arrangement in an air passage of an air cleaner. The method includes comprising the steps of preparing a fuel adsorption member, forming a first covering sheet on the fuel adsorption member by depositing molten resin on the fuel adsorption member, arranging a reinforcing net in the fuel adsorption member opposite the first covering sheet, forming a second covering sheet on the reinforcing net by depositing molten resin on the reinforcing net, and forming a fastening portion at peripheral portions of the first and second covering sheets by bonding the first and second covering sheets.

A further aspect of the present invention is an air cleaner. The cleaner includes a housing including an air passage, a filter element arranged to intersect with the air passage, and a fuel adsorption sheet arranged downstream of the filter element in the air passage. The fuel adsorption sheet includes a sheet base. A fuel adsorption member is arranged in the sheet base. A reinforcing net is arranged in the sheet base and includes a plurality of cords extending along a surface of the sheet base in at least three directions.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
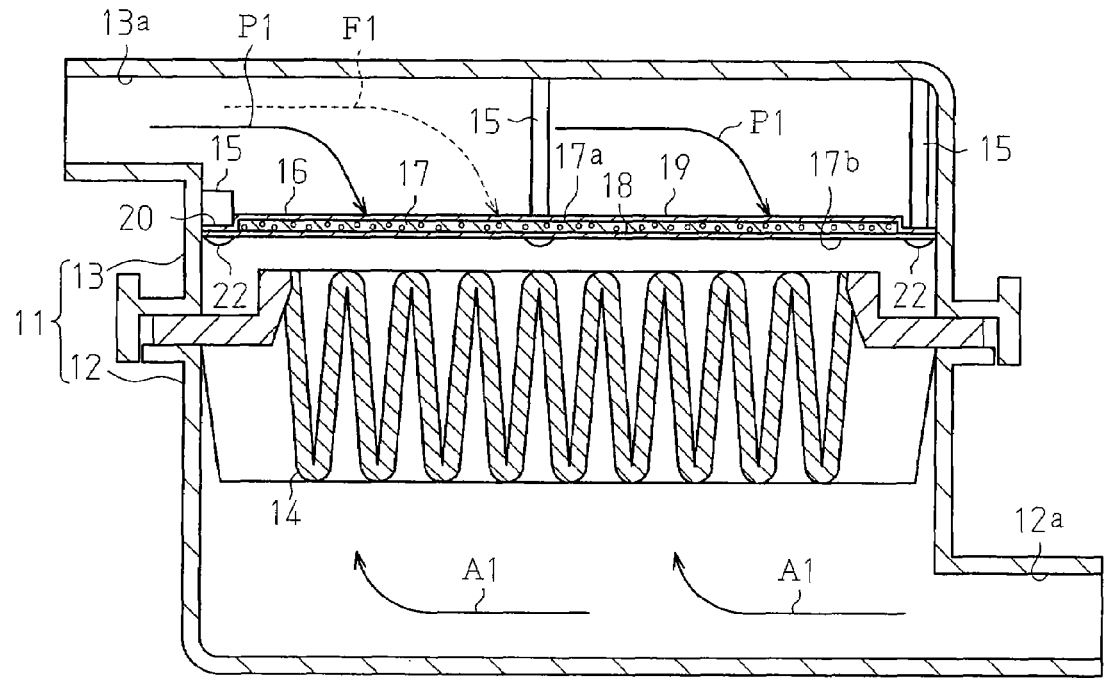
FIG. 1 is a cross-sectional view of an air cleaner incorporating a fuel adsorption sheet according to a preferred embodiment of the present invention.

A preferred embodiment of the present invention will now be discussed with reference to the accompanying drawings. As shown in FIG. 1, an air cleaner of the present embodiment includes a cleaner housing 11, which is formed by a first cleaner housing 12 having an inlet port 12a, and a second cleaner housing 13 having an outlet port 13a. The first cleaner housing 12 has an open upper portion, and the second cleaner housing 13 has an open lower portion. The first cleaner housing 12 is attached in a detachable manner to the second cleaner housing 13 by a clamp (not shown) in a state in which the opening of the first cleaner housing 12 faces toward the opening of the second cleaner housing 13.

A filter element 14, which is folded in an accordion-like manner, is arranged between the opening of the first cleaner housing 12 and the opening of the second cleaner housing 13. The filter element 14 is arranged to intersect with an air passage extending from the inlet port 12a to the outlet port 13a. The filter element 14 is designed to filter air A1 drawn into an air intake system of an engine. A plurality of fastening seats 15 extend from the inner wall of the second cleaner housing 13 at the downstream side of the filter element 14 in the air passage. The fastening seats 15 support a porous fuel adsorption sheet 16, which is arranged to intersect with the air passage. The fuel adsorption sheet 16 is designed to adsorb fuel vapor F1 that leaks out of the engine air intake system.

Figure 2:
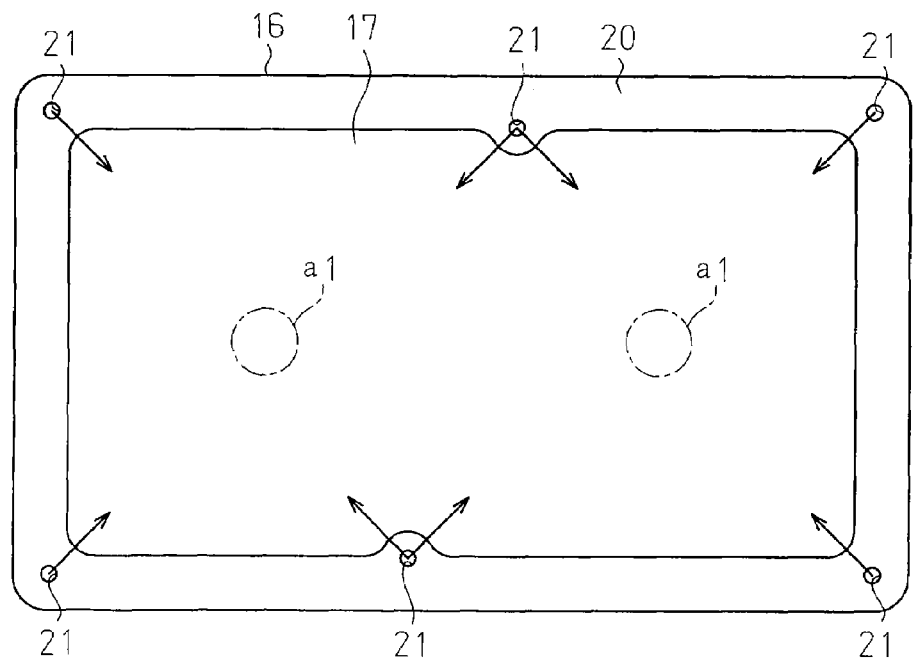
FIG. 2 is a plan view of the fuel adsorption sheet shown in FIG. 1.
Figure 3:
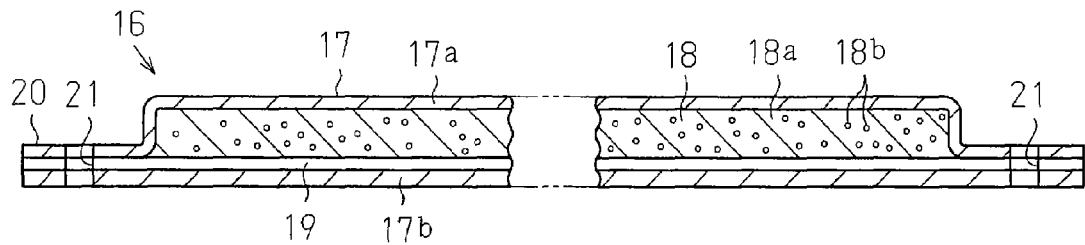
FIG. 3 is a partially enlarged cross-sectional view of the fuel adsorption sheet shown in FIG. 1.

The fuel adsorption sheet 16 will now be described in detail. As shown in FIGS. 1 to 3, the fuel adsorption sheet 16 includes a sheet base 17. A fuel adsorption member 18 and a reinforcing net 19 are arranged in the sheet base 17. The sheet base 17 includes two covering sheets (a first covering sheet 17a and a second covering sheet 17b) made of a nonwoven fabric of polyester, polyethylene, or the like. The fuel adsorption member 18 and the reinforcing net 19 are superimposed on top of each other and arranged in between the covering sheets 17a and 17b. Thus, the covering sheets 17a and 17b cover the fuel adsorption member 18 and the reinforcing net 19. The covering sheets 17a and 17b include central portions, which hold both of the fuel adsorption member 18 and the reinforcing net 19, and peripheral portions, which hold only the reinforcing net 19. The fuel adsorption member 18 is formed from granular adsorbents 18b of, for example, activated carbon, dispersed and held in a substantially uniform manner in a holding sheet 18a, which is made of nonwoven fabric. As shown in FIG. 3, in the fuel adsorption sheet 16, the fuel adsorption member 18 and the reinforcing net 19 are held between the covering sheets 17a and 17b such that they cause only the first covering sheet 17a to protrude. Consequently, a protrusion having a height corresponding to the thickness of the fuel adsorption member 18 is formed on the surface of the first covering sheet 17a, whereas the second covering sheet 17b is flat. The reinforcing net 19 is held between the flat covering sheet 17b and the fuel adsorption member 18.

As shown in FIGS. 2 and 3, the sheet base 17, more specifically, the peripheral portions of the covering sheets 17a and 17b are bonded together under pressure with the reinforcing net 19 held therebetween. As a result, the peripheral portion of the sheet base 17, or the peripheral portions of the covering sheets 17a and 17b, defines a fastening portion 20. The fastening portion 20 has a three-layered structure having high rigidity. The fastening portion 20 includes a plurality of fastening holes 21 formed at predetermined intervals.

A pin 22 is provided on each of the fastening seats 15 in the second cleaner housing 13. The pin 22 is inserted into one of the fastening holes 21. After the fuel adsorption sheet 16 is arranged on the fastening seat 15 so that the pins 22 are inserted through the fastening holes 21, the pins 22 are fused to fasten the fuel adsorption sheet 16 to the fastening seats 15.

Figure 4:
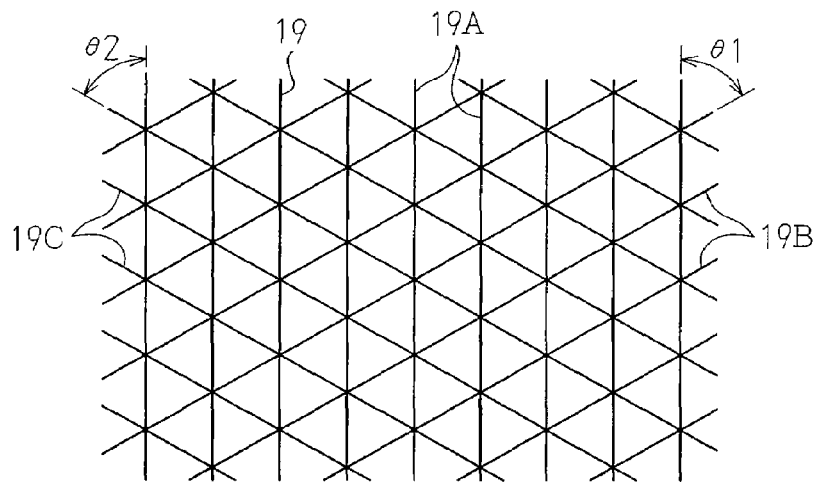
FIG. 4 is a partially enlarged plan view showing a reinforcing net.

As shown in FIG. 4, the reinforcing net 19 for the fuel adsorption sheet 16 is formed by a plurality of cords 19A, 19B, and 19C, which extend along the surface of the sheet base 17 in three different directions. The cords that are denoted by the same reference numeral extend in the same direction and are parallel to each other. Specifically, the first cords 19A are arranged to extend vertically as viewed in FIG. 4 and parallel to each other. The second cords 19B are arranged to extend intersecting with the first cords 19A at a predetermined angle θ1 (60 degrees in the present embodiment) and parallel to each other. More specifically, the second cords 19B are arranged to extend from the lower left side to the upper right side as viewed in FIG. 4. The third cords 19C are arranged to extend intersecting with the first cords 19A at a predetermined angle θ2 (60 degrees in this embodiment) and parallel to each other. More specifically, the third cords 19C are arranged to extend from the lower right side to the upper left side as viewed in FIG. 4.

Figure 5:
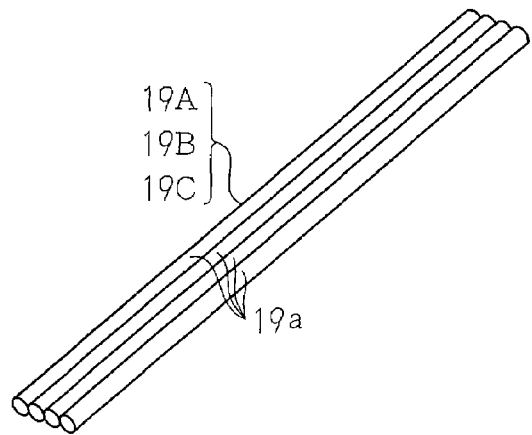
FIG. 5 is a partially enlarged perspective view showing cords forming the reinforcing net.

As shown in FIG. 5, each of the cords 19A, 19B, and 19C is formed by a plurality of threads 19a, which extend along the surface of the second covering sheet 17b adjacent to one another without any twisting. The threads 19a are filaments having a high tensile strength with a relatively low rigidity in bending directions. For example, inorganic fibers such as glass fibers or carbon fibers may be used as the threads 19a. In the present embodiment, as shown in FIG. 4, the cords 19A, 19B, and 19C are arranged to substantially intersect at the same points and form mesh holes with equilateral triangular shapes in the reinforcing net 19. The reinforcing net 19 reinforces the entire fuel adsorption sheet 16 by enabling the same to resist tensile force applied in multiple directions. Additionally, since the number of intersection points of the cords 19A, 19B, and 19C is small, ventilation resistance of the entire fuel adsorption sheet 16 is prevented from increasing when using the reinforcing net 19.

Figure 6:
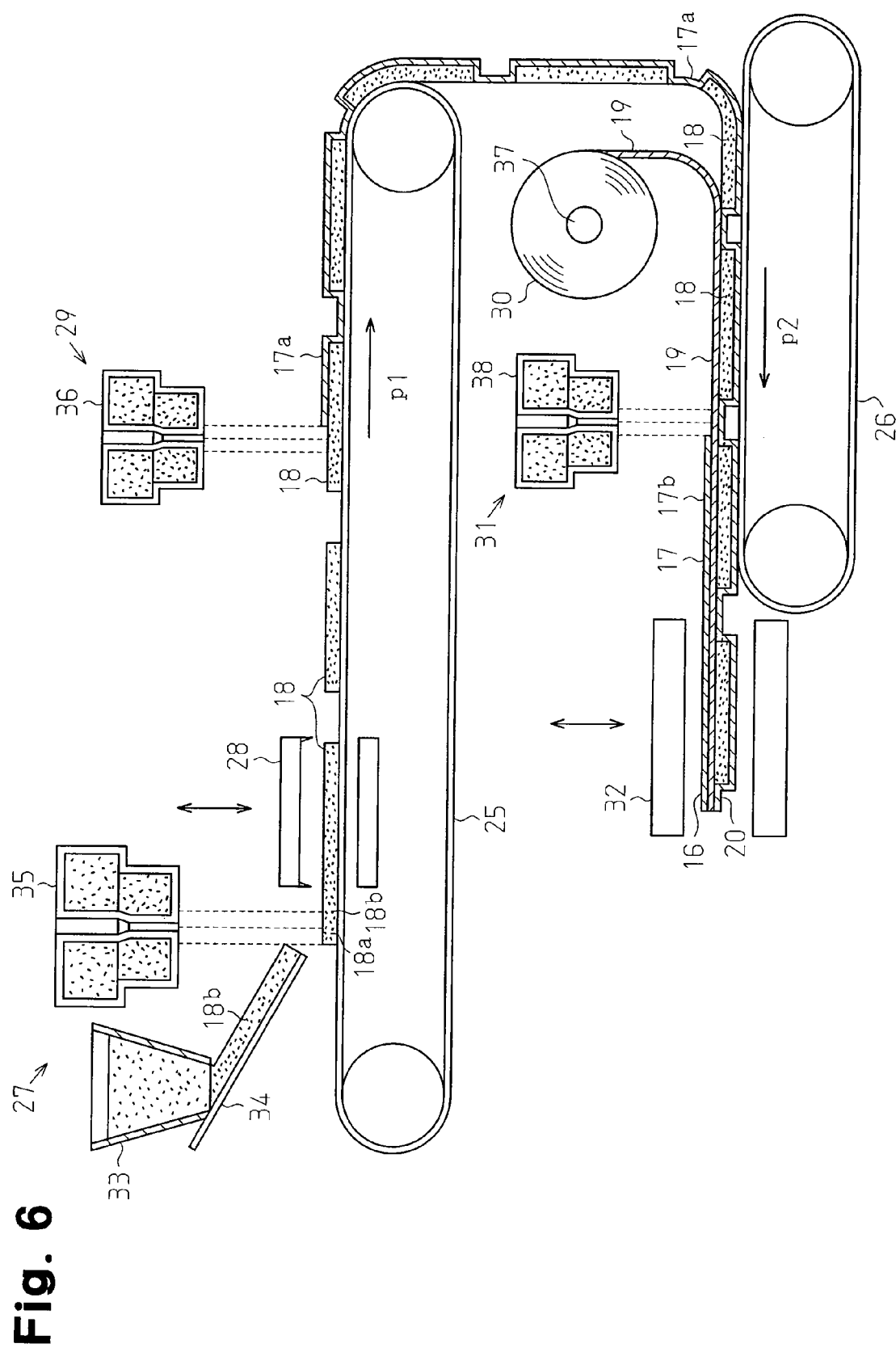
FIG. 6 is a schematic diagram showing the structure of an apparatus for manufacturing the fuel adsorption sheet.

An apparatus and method for manufacturing the fuel adsorption sheet 16 will now be described. As shown in FIG. 6, the manufacturing apparatus has an upper belt conveyor 25 and a lower belt conveyor 26. The belt conveyors 25 and 26 are arranged parallel to each other and spaced apart from each other by a predetermined distance. An adsorption member formation mechanism 27, a cutting mechanism 28, and a first sheet formation mechanism 29 are arranged sequentially in a conveying direction p1 above the upper belt conveyor 25. A reinforcing net feeding mechanism 30, a second sheet formation mechanism 31, and a cutting/press mechanism 32 are arranged sequentially in a conveying direction p2 above the lower belt conveyor 26.

The adsorption member formation mechanism 27 includes a hopper 33 having a chute 34, and a spinning nozzle 35. Granular adsorbents 18b of activated carbon are fed from the hopper 33 through the chute 34 and onto the upper belt conveyor 25, while molten resin of fine fibers is injected toward the granular adsorbents 18b from the spinning nozzle 35. This forms the fuel adsorption member 18, which includes the holding sheet 18a, in which fine fibers are arranged randomly at a low density, and the granular adsorbents 18b. The fuel adsorption member 18 is conveyed by the upper belt conveyor 25 in the conveying direction p1 as shown in FIG. 6. The cutting mechanism 28 then cuts the fuel adsorption member 18 on the upper belt conveyor 25 into a predetermined size. The first sheet formation mechanism 29 has a spinning nozzle 36. Fibrous molten resin is injected from the spinning nozzle 36 towards the fuel adsorption member 18 so that a first covering sheet 17a is formed on the surface of the fuel adsorption member 18 as a nonwoven fabric.

The fuel adsorption member 18 and the first covering sheet 17a are then transferred from the upper belt conveyor 25 onto the lower belt conveyor 26. This turns the fuel adsorption member 18 and the first covering sheet 17a upside down. The reinforcing net feeding mechanism 30 has a feeding roller 37. The reinforcing net 19 is drawn out from the feeding roller 37 and arranged on the fuel adsorption member 18 and the first covering sheet 17a. The second sheet formation mechanism 31 has a spinning nozzle 38. Fibrous molten resin is injected from the spinning nozzle 38 toward the reinforcing net 19. This forms the second covering sheet 17b on the surface of the reinforcing net 19 as a nonwoven fabric. In this state, the second covering sheet 17b is integrated with the first covering sheet 17a. As a result, the fuel adsorption member 18 and the reinforcing net 19 are held between and covered by the covering sheets 17a and 17b of the sheet base 17.

Figure 7:
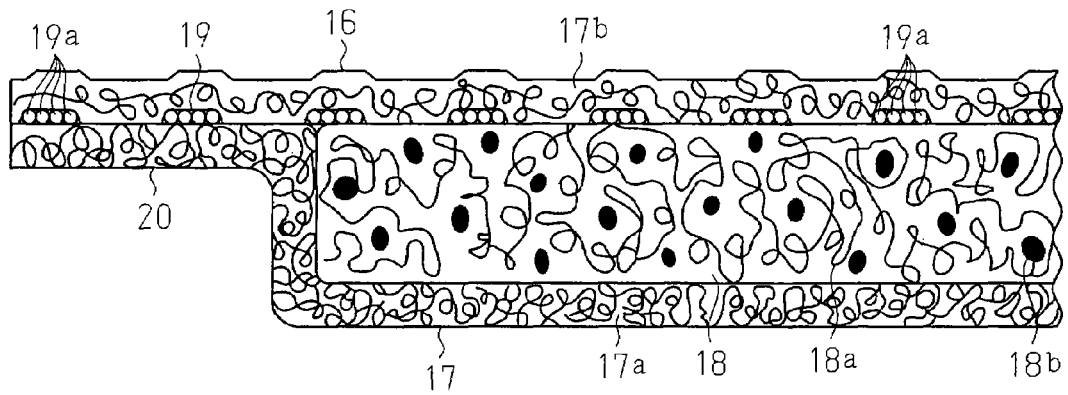
FIG. 7 is a partially enlarged cross-sectional view showing the fuel adsorption sheet in a pressed state.

As shown in FIG. 5, the cords 19A to 19C of the reinforcing net 19 are each formed by a plurality of threads 19a which are arranged adjacent to each other without being twisted. Accordingly, the cords 19A to 19C are laid out in a flat state. Further, since the threads 19a are formed of inorganic fibers having a low rigidity in the bending direction, such as glass fibers or carbon fibers, warping and undulation of the reinforcing net 19 seldom occurs when forming the reinforcing net 19. Additionally, as shown in FIG. 7, when molten resin is injected toward the reinforcing net 19, the molten resin passes through the mesh holes of the reinforcing net 19 and reaches the fuel adsorption member 18 and the first covering sheet 17a on the opposite side to form an integral nonwoven fabric layer. There are substantially no gaps in the peripheries of the cords 19A to 19C of the reinforcing net 19. Accordingly, the covering sheets 17a and 17b are tightly bonded together, and the reinforcing net 19 is securely fixed to the covering sheets 17a and 17b of the sheet base 17.

Figure 8:
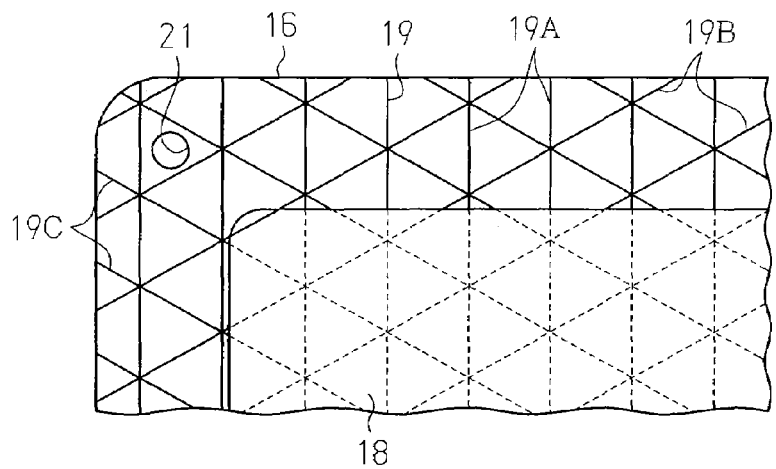
FIG. 8 is a partially enlarged plan view showing the fuel adsorption sheet with a fastening hole.

In the final stage, the covering sheets 17a and 17b of the sheet base 17 and the reinforcing net 19 are cut by the cutting/press mechanism 32 into a predetermined size to form the fuel adsorption sheet 16. At the same time, the peripheral portions of the covering sheets 17a and 17b of the sheet base 17 and the reinforcing net 19 are thermally pressed to form the fastening portion 20 having a three-layered structure at the peripheral portion of the fuel adsorption sheet 16. As shown in FIG. 8, a plurality of fastening holes 21 are formed at predetermined positions in the fastening portion 20 separated from locations where the cords 19A to 19C of the reinforcing net 19 are embedded. In this manner, the cords 19A to 19C of the reinforcing net 19 are not cut during the formation of the fastening holes 21. This prevents the strength of the fastening portion 20 from being reduced.

An air cleaner incorporating the fuel adsorption sheet 16 will now be described. During operation of the engine of a vehicle provided with such an air cleaner, as shown in FIG. 1, air A1 is drawn from the inlet port 12a into the cleaner housing 11 and towards the engine. Dust and the like suspended in the air A1 is filtered by the filter element 14.

If fuel vapor F1 leaks out of the engine air intake system when the engine stops running, the fuel vapor F1 enters the second cleaner housing 13 through the outlet port 13a of cleaner housing 11. In such a case, the fuel vapor F1, which is heavier than air, flows downward in the second cleaner housing 13 and is adsorbed by the granular adsorbents 18b contained in the fuel adsorption member 18 of the fuel adsorption sheet 16. Thus, fuel vapor F1 is not discharged into the atmosphere. This prevents the atmosphere from being polluted by the fuel vapor F1.

When the engine backfires, backfire pressure P1 will be communicated into the second cleaner housing 13 of the cleaner housing 11 from the outlet port 13a. As shown in FIG. 2, the backfire pressure P1 strongly acts on regions around middle points a1 in the fuel adsorption sheet 16. As a result, as shown in FIG. 2, regions around the fastening holes 21, though which the pins 22 are inserted, receive strong tensile force acting toward the middle points a1 of the fuel adsorption sheet 16.

In the present embodiment, however, the reinforcing net 19 is arranged in the sheet base 17 of the fuel adsorption sheet 16, and the reinforcing net 19 is formed of the cords 19A to 19C, which extend in three different directions. Accordingly, the mesh holes of the reinforcing net 19 are prevented from being deformed into rhomboidal shapes, and the tensile force acting in different directions on the regions around the fastening holes 21 in the fuel adsorption sheet 16 is received by the cords 19A to 19C of the reinforcing net 19. This prevents the fuel adsorption sheet 16 from projecting toward the filter element 14 and relieves the tensile force acting on the regions around the fastening holes 21 in the fuel adsorption sheet 16.

Accordingly, the reinforcing net 19 prevents portions of the fuel adsorption sheet 16 directly subjected to backfire pressure from being damaged. Additionally, the fastening portion 20 of the fuel adsorption sheet 16 is also prevented from being damaged. Since functional damages to the fuel adsorption sheet 16 are prevented, engine trouble that would be caused by debris from the fuel adsorption sheet 16 when broken would not occur. Further, there is no need to cover the peripheral portions of the fuel adsorption sheet 16 with, for example, a resin frame so that the peripheral portions of the fuel adsorption sheet 16 fastened to the cleaner housing 11 are reinforced to withstand backfire pressure P1. This simplifies the structure of the fuel adsorption sheet 16.

Furthermore, the reinforcing net 19 reduces deformation of the fuel adsorption sheet 16 and prevents the fuel adsorption sheet 16 from coming into contact with the filter element 14, which is located below the fuel adsorption sheet 16, when vibrations are produced in the vehicle. Accordingly, the space between the fuel adsorption sheet 16 and the filter element 14 may be narrowed to reduce the size of the entire air cleaner.

Inorganic fibers such as glass fibers are used for the threads 19a forming the cords 19A to 19C of the reinforcing net 19. Therefore, the cords 19A to 19C prevent the reinforcing net 19 from expanding and improve the heat resistance of the reinforcing net 19.

The entire fuel adsorption sheet 16 is simply reinforced by arranging in the sheet base 17 the reinforcing net 19, which is formed by the cords 19A to 19C that extend in at least three directions. This reduces manufacturing costs. In addition, since the reinforcing net 19 is formed of the cords 19A to 19C extending in at least three directions, the mesh holes of the reinforcing net 19 will not be deformed even if the fuel adsorption sheet 16 is subjected to backfire pressure. Accordingly, the reinforcing net 19 is capable of effectively receiving the backfire pressure without being expanded. Furthermore, since the expansion of the sheet base 17 is inhibited by the reinforcing net 19, the fuel adsorption sheet 16 is prevented from coming into contact with the filter element 14 when vibrations or the like are produced in the vehicle even if the filter element 14 is located near the fuel adsorption sheet 16. In contrast, when the reinforcing net is arranged so that the cords extend in only two directions, the mesh holes of the reinforcing net will be deformed into a rhomboidal shape and the reinforcing net will entirely expand.

When the molten resin is injected toward the reinforcing net 19, the molten resin passes through the mesh holes of the reinforcing net 19 and reaches the fuel adsorption member 18 and the first covering sheet 17a on the opposite side to form an integral nonwoven fabric layer. When doing so, substantially no gaps are formed at the peripheries of the cords 19A to 19C in the reinforcing net 19. This makes it possible to secure the reinforcing net 19 between the covering sheets 17a and 17b of the sheet base 17 and to increase the strength of the fastening portion 20.

It should be apparent to those skilled in the art that the present invention may be embodied in many other specific forms without departing from the spirit or scope of the invention. Particularly, it should be understood that the present invention may be embodied in the following forms.

Figure 9:
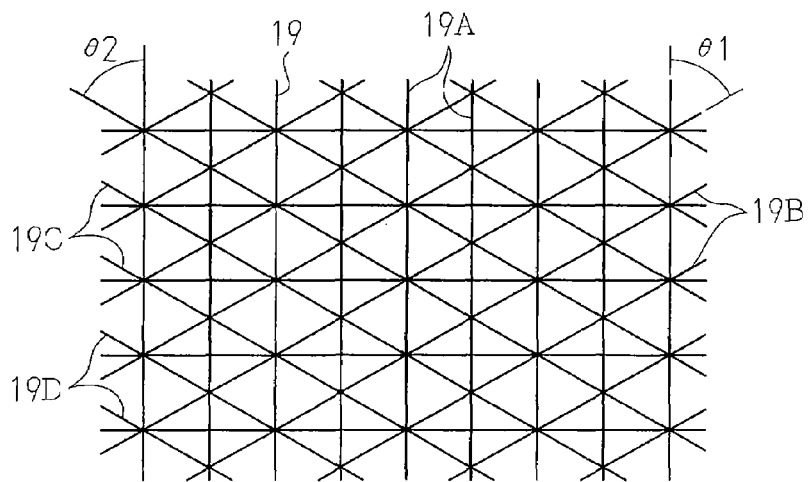
FIG. 9 is a partial plan view showing the reinforcing net in a first modification.

As shown in FIG. 9, the reinforcing net 19 may be formed of a plurality of cords 19A, 19B, 19C, and 19D, which extend in four different directions. In this case, the cords 19A to 19C are arranged to extend in the same direction as the cords 19A to 19C of the reinforcing net 19 in the first embodiment. The cords 19D are arranged to intersect orthogonally with the cords 19A. Specifically, the cords 19D are arranged to extend horizontally as viewed in FIG. 9.

Figure 10:
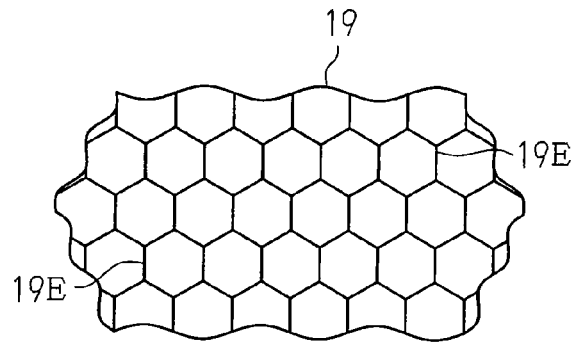
FIG. 10 is a partial plan view showing a reinforcing net in a second modification.

As shown in FIG. 10, the reinforcing net 19 may be formed of cords 19E arranged so that mesh holes of the reinforcing net 19 have polygonal shapes other than a tetragonal shape. For example, the mesh holes may have a hexagonal shape.

Figure 11:
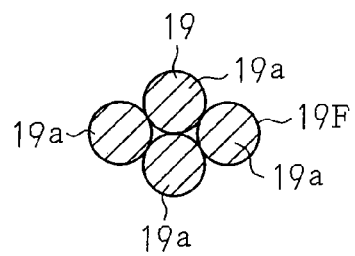
FIG. 11 is a cross-sectional view showing a cord in a third modification.
Figure 12:
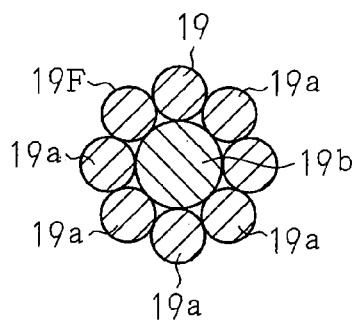
FIG. 12 is a cross-sectional view showing a cord in a fourth modification.

As shown in FIGS. 11 and 12, the reinforcing net 19 may be formed of cords 19F, each of which is a strand including a plurality of threads 19a. FIG. 11 shows a cord 19F which is formed by twisting a plurality of threads 19a having the same thickness. FIG. 12 shows a cord 19F, which includes a thread 19b serving as a core and a plurality of threads 19a which are thinner than the thread 19b. The cord 19F is formed by spirally twisting the threads 19a around the thread 19b.

Figure 13:
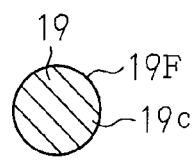
FIG. 13 is a cross-sectional view showing a cord in a fifth modification.

As shown in FIG. 13, the reinforcing net 19 may be formed of cords 19F including only a single thread 19c.

Figure 14:
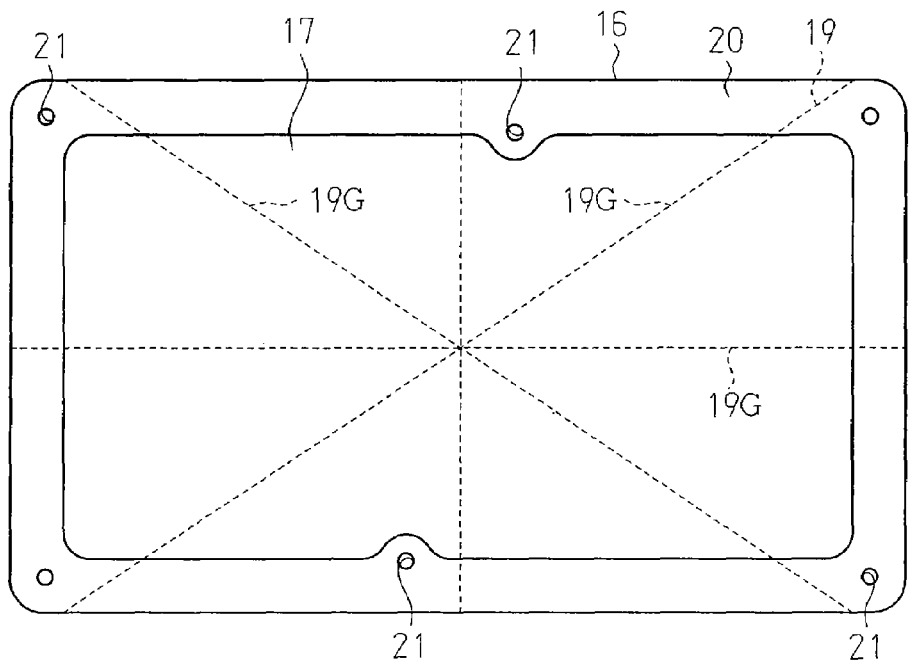
FIG. 14 is a plan view showing a fuel adsorption sheet including a reinforcing net in a sixth modification.
Figure 15:
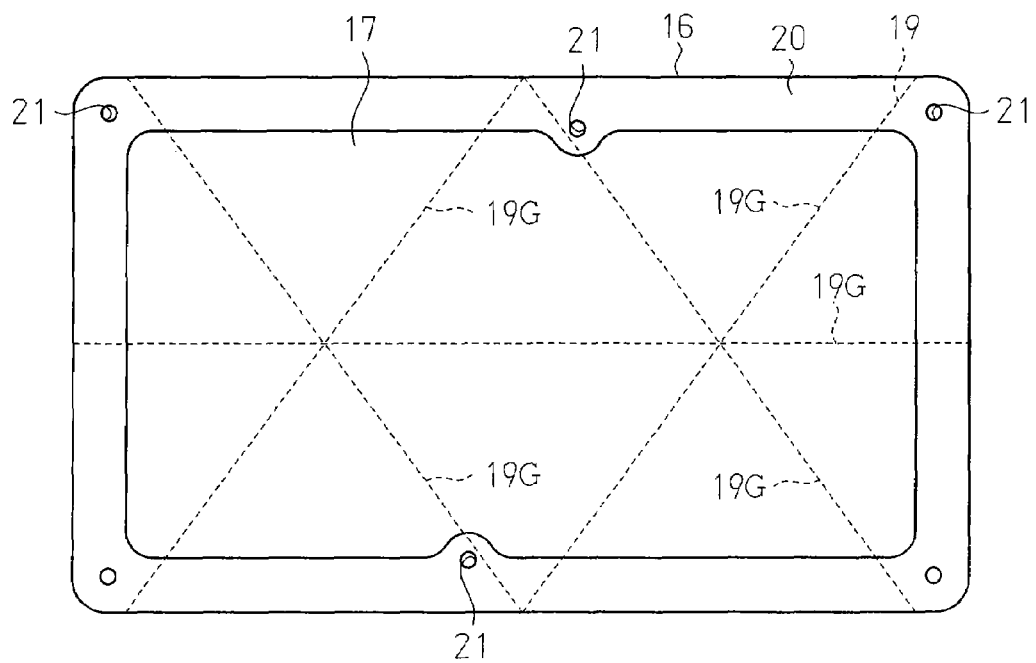
FIG. 15 is a plan view showing a fuel adsorption sheet including a reinforcing net in a seventh modification.

The reinforcing net 19 may be formed of a plurality of cords 19G extending radially. In this case, as shown in FIG. 14, the cords 19G are preferably arranged to extend radially from any position lying along a center line of the fuel adsorption sheet 16. More preferably, as shown in FIG. 15, the cords 19g are arranged to extend from the above middle points al to pass beside each of the fastening holes 21. The middle points al are located on the center line of the fuel adsorption sheet. As described above, when the engine backfires, the backfire pressure P1 will act strongly on the regions around the middle points a1. The fuel adsorption sheet 16 formed in this manner receive with the cords 19G, strong tensile force acting on the regions around the fastening holes 21 toward the middle points a1 when the engine backfires.

The thread may be formed of organic fibers such as aramid fibers instead of inorganic fibers.

The present examples and embodiments are to be considered as illustrative and not restrictive, and the invention is not to be limited to the details given herein, but may be modified within the scope and equivalence of the appended claims.

What is claimed is:

1. A fuel adsorption sheet for arrangement in an air passage of an air cleaner, the fuel adsorption sheet comprising:
   a sheet base;
   a fuel adsorption member arranged in the sheet base; and
   a reinforcing net arranged in the sheet base and including a plurality of cords extending along a surface of the sheet base in at least three directions.

2. The fuel adsorption sheet according to claim 1, wherein:
   the sheet base includes a pair of covering sheets, each covering sheet having a central portion and a peripheral portion;
   the pair of covering sheets hold the fuel adsorption member and the reinforcing net between the central portions and hold only the reinforcing net between the peripheral portions; and
   a fastening portion is defined in the peripheral portions of the sheet base when bonding the pair of covering sheets.

3. The fuel adsorption sheet according to claim 2, wherein each of the cords is formed by a plurality of threads extending adjacent to each other along surfaces of the covering sheets.

4. The fuel adsorption sheet according to claim 2, wherein:
   the air cleaner includes a housing having a pin;
   the fastening portion includes a fastening hole; and
   the fuel adsorption sheet is fixed to the housing by inserting the pin through the fastening hole.

5. The fuel adsorption sheet according to claim 4, wherein the fastening hole is formed in the fastening portion at a location separated from the cords.

6. The fuel adsorption sheet according to claim 4, wherein each of the cords is formed by a plurality of threads extending adjacent to each other along surfaces of the covering sheets.

7. The fuel adsorption sheet according to claim 2, wherein each of the cords is formed by a plurality of threads.

8. The fuel adsorption sheet according to claim 7, wherein each of the cords is formed by twisting a plurality of threads.

9. The fuel adsorption sheet according to claim 1, wherein each of the cords is formed by inorganic fibers.

10. The fuel adsorption sheet according to claim 1, wherein the cords are arranged to extend radially from any position lying along a center line of the fuel adsorption sheet.

11. The fuel adsorption sheet according to claim 10, wherein the fuel adsorption sheet is designed such that engine backfire pressure is directed to positions lying along the center line of the fuel adsorption sheet, and each of the cords are arranged to extend from said positions on the center line and to pass beside a fastening hole.

12. An air cleaner comprising:
   a housing including an air passage;
   a filter element arranged to intersect with the air passage; and
   a fuel adsorption sheet arranged downstream of the filter element in the air passage, the fuel adsorption sheet including:
   a sheet base;
   a fuel adsorption member arranged in the sheet base; and
   a reinforcing net arranged in the sheet base and including a plurality of cords extending along a surface of the sheet base in at least three directions.

* * * * *